(12) United States Patent
Saruwatari et al.

(10) Patent No.: US 11,024,836 B2
(45) Date of Patent: Jun. 1, 2021

(54) POSITIVE ELECTRODE ACTIVE MATERIAL FOR NON-AQUEOUS ELECTROLYTE SECONDARY BATTERY AND METHOD FOR MANUFACTURING THE SAME, POSITIVE ELECTRODE MIXED MATERIAL PASTE FOR NON-AQUEOUS ELECTROLYTE SECONDARY BATTERY, AND NON-AQUEOUS ELECTROLYTE SECONDARY BATTERY

(71) Applicant: SUMITOMO METAL MINING CO., LTD., Tokyo (JP)

(72) Inventors: Motoaki Saruwatari, Niihama (JP); Kazuomi Ryoshi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 59 days.

(21) Appl. No.: 16/301,808

(22) PCT Filed: May 12, 2017

(86) PCT No.: PCT/JP2017/018105
§ 371 (c)(1),
(2) Date: Nov. 15, 2018

(87) PCT Pub. No.: WO2017/199891
PCT Pub. Date: Nov. 23, 2017

(65) Prior Publication Data
US 2019/0165360 A1 May 30, 2019

(30) Foreign Application Priority Data

May 16, 2016 (JP) .............................. JP2016-098093
Nov. 9, 2016 (JP) .............................. JP2016-218994

(51) Int. Cl.
*H01M 4/131* (2010.01)
*H01M 4/1391* (2010.01)
(Continued)

(52) U.S. Cl.
CPC .......... *H01M 4/131* (2013.01); *C01B 35/121* (2013.01); *C01G 53/42* (2013.01); *H01M 4/0471* (2013.01);
(Continued)

(58) Field of Classification Search
None
See application file for complete search history.

(56) References Cited

U.S. PATENT DOCUMENTS

2011/0315918 A1 12/2011 Kawai et al.
2013/0277604 A1 10/2013 Shimokita et al.
(Continued)

FOREIGN PATENT DOCUMENTS

JP 2004-335278 A 11/2004
JP 2005-251716 A 9/2005
(Continued)

OTHER PUBLICATIONS

International Search Report dated Jun. 13, 2017, issued in counterpart Application No. PCT/JP2017/018105, with English translation (5 pages).
(Continued)

*Primary Examiner* — Stewart A Fraser
(74) *Attorney, Agent, or Firm* — Westerman, Hattori, Daniels & Adrian, LLP

(57) ABSTRACT

The present invention has an object to provide a positive electrode active material for a non-aqueous electrolyte secondary battery which not only suppresses gelation of a positive electrode mixed material paste upon producing the non-aqueous electrolyte secondary battery but also improves
(Continued)

the stability thereof. Provided is the positive electrode active material represented by general formula $Li_sNi_{1-x-y-z}Co_xM-n_yM_zO_{2+\alpha}$ ($0 \leq x \leq 0.35$, $0 \leq y \leq 0.35$, $0 \leq z \leq 0.10$, $0.95 < s < 1.30$, and $0 \leq \alpha \leq 0.2$, and M represents at least one element selected from V, Mg, Mo, Nb, Ti, W, and Al) and containing secondary particles formed by agglomeration of primary particles, wherein at least part of the surface of the primary particles thereof is covered with a lithium boron compound, and the amount of redundant lithium hydroxide of the positive electrode active material measured with a neutralization titration is at least 0.003% by mass and up to 0.5% by mass relative to the total of the positive electrode active material.

12 Claims, 4 Drawing Sheets

(51) Int. Cl.
| | |
|---|---|
| H01M 4/505 | (2010.01) |
| H01M 4/525 | (2010.01) |
| H01M 4/36 | (2006.01) |
| C01G 53/00 | (2006.01) |
| C01B 35/12 | (2006.01) |
| H01M 4/04 | (2006.01) |
| H01M 10/0525 | (2010.01) |

(52) U.S. Cl.
CPC ............ *H01M 4/1391* (2013.01); *H01M 4/36* (2013.01); *H01M 4/505* (2013.01); *H01M 4/525* (2013.01); *H01M 10/0525* (2013.01); *C01P 2004/50* (2013.01); *C01P 2004/51* (2013.01); *C01P 2004/61* (2013.01); *C01P 2004/84* (2013.01)

(56) References Cited

U.S. PATENT DOCUMENTS

| | | | |
|---|---|---|---|
| 2014/0057163 A1* | 2/2014 | Bae | C01G 51/52 |
| | | | 429/211 |
| 2014/0154581 A1 | 6/2014 | Kawasato et al. | |
| 2015/0108397 A1 | 4/2015 | Takeoka et al. | |
| 2017/0263920 A1* | 9/2017 | Choi | H01M 10/0525 |
| 2017/0317339 A1 | 11/2017 | Shimokita et al. | |

FOREIGN PATENT DOCUMENTS

| | | | |
|---|---|---|---|
| JP | 2009-146739 A | | 7/2009 |
| JP | 2010-040382 A | | 2/2010 |
| JP | 2010040383 A2 | † | 2/2010 |
| JP | 2011-108554 A | | 6/2011 |
| JP | 2012-028313 A | | 2/2012 |
| JP | 2013-084395 A | | 5/2013 |
| JP | 2013-239434 A | | 11/2013 |
| JP | 2015-099767 A | | 5/2015 |
| JP | 2015-201431 A | | 11/2015 |
| JP | 2015225741 A2 | † | 12/2015 |
| KR | 20160026306 A | † | 3/2016 |
| WO | 2013/021955 A1 | | 2/2013 |
| WO | 2016/017074 A1 | | 2/2016 |
| WO | WO-2016032289 A1 * | | 3/2016 ........ H01M 10/0525 |
| WO | 2017/073238 A1 | | 5/2017 |

OTHER PUBLICATIONS

International Preliminary Report on Patentability (Form PCT/IB/373) issued in counterpart International Application No. PCT/JP2017/018105 dated Nov. 20, 2018, with Form PCT/ISA/237, with English translation (13 pages).

* cited by examiner
† cited by third party

POSITIVE ELECTRODE ACTIVE MATERIAL FOR NON-AQUEOUS ELECTROLYTE SECONDARY BATTERY AND METHOD FOR MANUFACTURING THE SAME, POSITIVE ELECTRODE MIXED MATERIAL PASTE FOR NON-AQUEOUS ELECTROLYTE SECONDARY BATTERY, AND NON-AQUEOUS ELECTROLYTE SECONDARY BATTERY

TECHNICAL FIELD

The present invention relates to a positive electrode active material for a non-aqueous electrolyte secondary battery and a method for manufacturing the same, as well as a positive electrode mixed material paste for a non-aqueous electrolyte secondary battery and a non-aqueous electrolyte secondary battery.

BACKGROUND ART

With the recent wide spreading use of portable electronic devices such as a mobile phone and a notebook personal computer, there has been a strong demand to develop a small light non-aqueous electrolyte secondary battery having a high energy density. In addition, there has been a strong demand to develop a secondary battery which is excellent in the output characteristic as well as the charge-discharge cycle characteristic as a battery for an electric car including a hybrid car.

As the secondary battery satisfying these requirements, a positive electrode active material for a non-aqueous electrolyte secondary battery may be cited. A lithium ion secondary battery may be cited as a representative of the secondary battery. The lithium ion secondary battery includes a negative electrode, a positive electrode, an electrolyte solution, and the like. Active materials of the negative and positive electrodes capable of de-inserting and inserting lithium are used.

The lithium ion secondary battery is now under active research and development. In particular, the lithium ion secondary battery using a lithium-metal composite oxide in a layered form or a spinel form can generate a high voltage of a 4-V class, so that this type of battery has been put into practical use as the battery having a high energy density.

Illustrative example of a material which has been proposed mainly includes: a lithium-cobalt composite oxide ($LiCoO_2$), which can be synthesized comparatively easily; a lithium-metal composite oxide ($LiNiO_2$), which uses nickel, which is a cheaper material than cobalt; a lithium-nickel-cobalt-manganese composite oxide ($LiNi_{1/3}Co_{1/3}Mn_{1/3}O_2$); and a lithium-manganese composite oxide ($LiMn_2O_4$), which uses manganese. For further improvement of the charge-discharge cycle characteristic, for example, to include lithium with the amount more than a stoichiometric composition of the metal elements such as nickel, cobalt, and manganese is effective.

For further improvement of the charge-discharge cycle characteristic, for example, to include lithium with the amount thereof being more than a stoichiometric composition of the metal elements such as nickel, cobalt, and manganese is effective. In addition, several proposals to improve battery characteristics by adding a compound including boron and so forth to a lithium-nickel-cobalt composite oxide have been made.

For example, in Patent Literature 1, a positive electrode active material for a non-aqueous electrolyte secondary battery is proposed, in which the material is a positive electrode active material for a non-aqueous electrolyte secondary battery having at least a lithium-transition metal composite oxide with a layered structure; the lithium-transition metal composite oxide exists as a particle formed of any one or both of primary particles and a secondary particle formed of an agglomerate of primary particles; an aspect ratio of the primary particles is 1 to 1.8; and the material has at least on the surface of the particle thereof a compound having at least one element selected from the group consisting of molybdenum, vanadium, tungsten, boron, and fluorine. It is considered that electric conductivity thereof is increased when it has on the surface of the particle thereof at least a compound having at least one element selected from the group consisting of molybdenum, vanadium, tungsten, boron, and fluorine.

In Patent Literature 2, lithium-transition metal compound powder for the positive electrode material for a lithium secondary battery is proposed, in which the powder contains a lithium-transition metal compound having a function capable of inserting and de-inserting a lithium ion as a main component thereof and is obtained by firing a mixture of the main component raw material with one compound having at least one element selected from B and Bi and one compound having at least one element selected from Mo, W, Nb, Ta, and Re. It is considered that by firing the mixture which is obtained after the elements are added and combined, the lithium-transition metal compound powder with fine particles whose grain growth and sintering are suppressed can be obtained, and not only the rate and output characteristic thereof can be improved but also the lithium-containing transition metal compound powder which is easy in handling and in preparation of an electrode can be obtained.

In Patent Literature 3, a positive electrode composition for a non-aqueous electrolyte secondary battery is proposed in which the material contains a lithium-transition metal composite oxide represented by a general formula of $Li_a Ni_{1-x-y}Co_xM1_yW_zM2_wO_2$ ($1.0 \le a \le 1.5$, $0 \le x \le 0.5$, $0 \le y \le 0.5$, $0.002 \le z \le 0.03$, $0 \le w \le 0.02$, and $0 \le x+y \le 0.7$; M1 represents at least one element selected from the group consisting of Mn and Al; and M2 represents at least one element selected from the group consisting of Zr, Ti, Mg, Ta, Nb, and Mo) and a boron compound including at least a boron element and an oxygen element. It is considered that when the positive electrode composition containing the lithium-transition metal composite oxide including nickel and tungsten as essential elements and a certain boron compound is used, the output characteristic and the cycle characteristic can be improved in the positive electrode composition using the lithium-transition metal composite oxide.

In Patent Literature 4, a positive electrode active material for a non-aqueous electrolyte secondary battery is proposed in which the positive electrode active material for a non-aqueous electrolyte secondary battery contains at least a lithium-transition metal composite oxide having a layered crystal structure, and the lithium-transition metal composite oxide is a particle yet having lithium borate at least on the surface thereof. It is considered that when the material contains lithium borate on the surface of the particle, the heat stability thereof can be improved while keeping the initial discharge capacity and initial efficiency thereof at the same levels.

In Patent Literature 5, a method for manufacturing a positive electrode active material is proposed in which the method includes a process in which at least one of a sulfate salt and a boric acid compound is attached to a composite oxide particle having lithium (Li) and at least one of nickel (Ni) and cobalt (Co) and a process in which the composite oxide particle having at least one of the sulfate salt and the boric acid compound attached thereto is subjected to heat treatment under an oxidative atmosphere. It is considered that according to this proposal, a positive electrode active material capable of realizing a secondary battery which is high in the capacity as well as in the charge-discharge efficiency can be produced.

In Patent Literature 6, a positive electrode active material is proposed in which the material includes a carbonate ion with the content of 0.15% or smaller by weight and a borate ion with the content of at least 0.01% by weight and up to 5.0% by weight; the material being obtained by heat treatment of a composite oxide particle having a boric acid compound attached thereto, and the particle being represented by an average composition of $Li_aNi_xCo_yAl_zO_2$ (where Ni may be substituted with one metal element or two or more metal elements selected from the group consisting of Mn, Cr, Fe, V, Mg, Ti, Zr, Nb, Mo, W, Cu, Zn, Ga, In, Sn, La, and Ce, provided that the substitution amount thereof is up to 0.1 of Ni when the total amount of Ni is regarded as 1; in the formula a, x, y, and z each represents the values of $0.3 \leq a \leq 1.05$, $0.60 < x < 0.90$, $0.10 < y < 0.40$, and $0.01 < z < 0.20$; and x, y, and z are in the relation of $x+y+z=1$). It is considered that by attaching the boric acid compound to the particle, the carbonate group included in the composite oxide particle is substituted with the boric acid compound thereby realizing reduction of the gas generation inside the cell of the secondary battery.

The positive electrode of the non-aqueous electrolyte secondary battery is formed by applying a positive electrode mixed material paste onto an electric collector such as aluminum foil, the paste being obtained, for example, by mixing a positive electrode active material with a binder such as polyvinylidene fluoride (PVDF) and a solvent such as N-methyl-2-pyrrolidone (NMP). In this process, if lithium is liberated from the positive electrode active material in the positive electrode mixed material paste, the lithium can occasionally react with the water included in the binder and so forth to form lithium hydroxide. The lithium hydroxide thus formed then reacts with the binder thereby occasionally causing gelation of the positive electrode mixed material paste. The gelation of the positive electrode mixed material paste leads to deterioration in operability and yield. This tendency is eminent when lithium is included with the amount thereof being more than the stoichiometric ratio in the positive electrode active material and the ratio of nickel is high.

Several attempts to suppress gelation of the positive electrode mixed material paste have been made. For example, Patent Literature 7 proposes a positive electrode composition for a non-aqueous electrolyte solution secondary battery including a positive electrode active material including a lithium-transition metal composite oxide and added particles including acidic oxide particles. It is described therein that in this positive electrode composition, lithium hydroxide formed by the reaction with the water that is included in the binder reacts preferentially with the acidic oxide thereby suppressing the reaction of the generated lithium hydroxide with the binder so that gelation of the positive electrode mixed material paste is suppressed. It is also described that the acidic oxide plays a role of a conductive agent in the positive electrode to lower a resistance of the entire positive electrode thereby contributing to improvement of the output characteristic of the battery.

In Patent Literature 8, a method for manufacturing a lithium ion secondary battery is proposed, in which the method for manufacturing a lithium ion secondary battery includes: a lithium transition-metal oxide including LiOH is prepared as the positive electrode active material outside the composition; a molar quantity P of LiOH included per 1 g of the positive electrode active material is grasped; to the molar quantity P of LiOH, tungsten oxide including at least 0.05 moles in terms of the tungsten atom per 1 mole of LiOH is prepared; and the positive electrode paste is prepared by kneading the positive electrode active material and tungsten oxide together with a conductive agent and a binder in an organic solvent.

CITATION LIST

Patent Literatures

[Patent Literature 1] Japanese Unexamined Patent Application Publication No. 2005-251716
[Patent Literature 2] Japanese Unexamined Patent Application Publication No. 2011-108554
[Patent Literature 3] Japanese Unexamined Patent Application Publication No. 2013-239434
[Patent Literature 4] Japanese Unexamined Patent Application Publication No. 2004-335278
[Patent Literature 5] Japanese Unexamined Patent Application Publication No. 2009-146739
[Patent Literature 6] Japanese Unexamined Patent Application Publication No. 2010-040382
[Patent Literature 7] Japanese Unexamined Patent Application Publication No. 2012-028313
[Patent Literature 8] Japanese Unexamined Patent Application Publication No. 2013-084395

SUMMARY OF INVENTION

Technical Problems

All of the proposals described above claim that battery characteristics such as an output characteristic are improved; however, addition of boron can occasionally cause the gelation problem of the positive electrode mixed material paste during production of the electrode. Therefore, not only improvement of the battery characteristics such as an output characteristic and a battery capacity but also further improvement in reduction of gelation is wanted.

In the proposal of Patent Literature 7, because the acidic oxide particle remains in the battery, there is a risk of breakage of a separator and deterioration of the safety due to this breakage. Besides, it cannot be said that suppression of gelation in the positive electrode composition is sufficient. In addition, in the positive electrode composition mentioned above, even though suppression of gelation can be improved by increasing the addition amount of the acidic oxide, addition of the acidic oxide causes an increased weight of the positive electrode thereby leading to deterioration of the battery capacity per unit mass and to an increased cost of raw materials. In the proposal of Patent Literature 8, it cannot be said that the risk of breakage of the separator due to residual acidic oxide is eliminated, and neither can be said that the problem to suppress the gelation is solved. Furthermore, addition of tungsten, which is a heavy element not contributing to the charge-discharge, causes the problem of significant decrease in the battery capacity per unit weight.

In view of the problems mentioned above, the present invention intends to provide: a positive electrode active material having the gelation thereof suppressed; and a positive electrode mixed material paste and a non-aqueous electrolyte secondary battery using the same. Furthermore, the present invention intends to provide a simple method for manufacturing the positive electrode active material having the gelation thereof suppressed.

Solution to Problems

In order to solve the problems described above, the inventors of the present invention carried out an extensive investigation on suppression of gelation of the positive electrode mixed material paste for a non-aqueous electrolyte secondary battery; and as a result, they found that in order to suppress gelation of the positive electrode mixed material paste, control of the amount of the lithium hydroxide that is eluted from the positive electrode active material (lithium-metal composite oxide) is important, and in addition, they found that when the lithium-metal composite oxide is mixed with a boron compound thereby forming a lithium boron compound on the surface of the lithium-metal composite oxide particle, gelation of the positive electrode mixed material paste can be suppressed. With these findings, the present invention has been completed.

According to a first embodiment of the present invention, provided is a positive electrode active material for a non-aqueous electrolyte secondary battery, in which the material contains a lithium-metal composite oxide represented by a general formula $Li_sNi_{1-x-y-z}Co_xMn_yM_zO_{2+\alpha}$ (where $0 \leq x \leq 0.35$, $0 \leq y \leq 0.35$, $0 \leq z \leq 0.10$, $0.95 < s < 1.30$, and $0 \leq \alpha \leq 0.2$; and M represents at least one element selected from V, Mg, Mo, Nb, Ti, W, and Al) and a lithium boron compound; the lithium-metal composite oxide contains a secondary particle formed by agglomeration of primary particles; at least part of the surface of the primary particles is covered with the lithium boron compound; and the amount of an eluted lithium hydroxide measured with a neutralization titration method upon dispersing the positive electrode active material in water is at least 0.003% by mass and up to 0.5% by mass in terms of Li relative to the total of the positive electrode active material.

The amount of boron included in the lithium boron compound is preferably at least 0.03% by mole and up to 8% by mole relative to the total of Ni, Co, Mn, and M in the positive electrode active material. In addition, it is preferable that the lithium boron compound include lithium borate.

According to a second embodiment of the present invention, provided is a method for manufacturing a positive electrode active material for a non-aqueous electrolyte secondary battery, in which the method includes: mixing fired powder including a lithium-metal composite oxide having a crystal structure of a layered structure, a boron compound not including lithium but being capable of reacting with lithium, and water; and drying the resultant mixture obtained by the mixing to obtain a positive electrode active material; and the fired powder is represented by a general formula $Li_sNi_{1-x-y-z}Co_xMn_yM_zO_{2+\alpha}$ (where $0 \leq x \leq 0.35$, $0 \leq y \leq 0.35$, $0 \leq z \leq 0.10$, $0.95 < s < 1.30$, and $0 \leq \alpha \leq 0.2$; and M represents at least one element selected from V, Mg, Mo, Nb, Ti, W, and Al) and contains a secondary particle formed by agglomeration of primary particles; and the boron compound is mixed such that the amount of an eluted lithium hydroxide measured with a neutralization titration method upon dispersing the positive electrode active material in water is at least 0.003% by mass and up to 0.5% by mass relative to the total of the positive electrode active material.

It is preferable that after mixing the boron compound with the fired powder, the water be added to the resultant mixture with an amount thereof being at least 1% by mass and up to 40% by mass relative to the fired powder. In addition, the drying is carried out preferably at least 100° C. and up to 300° C. In addition, in the positive electrode active material, it is preferable that the surface of the primary particles be covered with a lithium boron compound. In addition, it is preferable that the boron compound include at least one of boric acid, boron oxide, and ammonium borate. In addition, an addition amount of boron included in the boron compound is preferably at least 0.03% by mole and up to 8% by mole relative to the total of Ni, Co, Mn, and M in the fired powder.

According to a third embodiment of the present invention, provided is a positive electrode mixed material paste for a non-aqueous electrolyte secondary battery in which the paste includes the above-mentioned positive electrode active material for the non-aqueous electrolyte secondary battery.

According to a fourth embodiment of the present invention, provided is a non-aqueous electrolyte secondary battery having a positive electrode including the positive electrode active material for a non-aqueous electrolyte secondary battery.

Advantageous Effects of the Invention

The present invention can provide a positive electrode active material capable of giving a positive electrode mixed material slurry with suppressed gelation and with high stability. In addition, the production method thereof is easy and suitable for production in an industrial scale, so that the industrial value thereof is very high.

DESCRIPTION OF EMBODIMENTS

Figure 1:
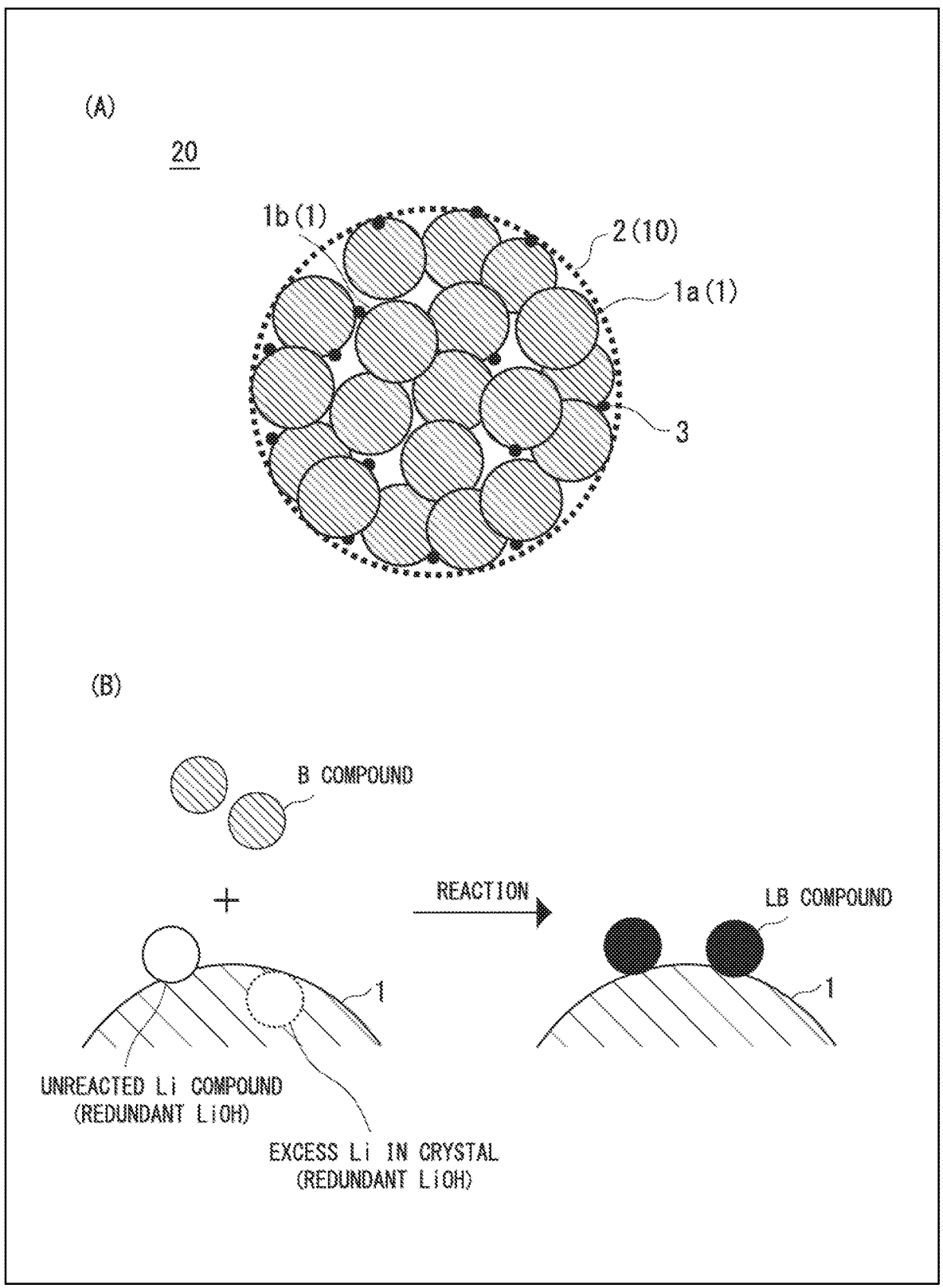
FIG. 1 illustrates one example of a positive electrode active material for a non-aqueous electrolyte secondary battery of the embodiment.

Hereinafter, with referring to the drawings, one embodiment of the present invention will be explained with regard to: a positive electrode active material for the non-aqueous electrolyte secondary battery, a method for manufacturing the same, a positive electrode mixed material paste for the non-aqueous electrolyte secondary battery, and a non-aqueous electrolyte secondary battery. Meanwhile, in order to help to understand each component more easily, the drawings are expressed with emphasizing or omitting some parts thereof; and thus, the structure, shape, drawing scale, or the like may be different from those of actual ones.

[Positive Electrode Active Material]

First, the positive electrode active material for a non-aqueous electrolyte secondary battery (hereinafter, this is sometimes referred to as "positive electrode active material") relating to the present invention will be explained with referring to FIG. 1. FIG. 1(A) is the drawing which illustrates one example of the positive electrode active material relating to the present embodiment; and FIG. 1(B) is the schematic drawing which illustrates the formation process of the lithium boron compound relating to the present embodiment.

As illustrated in FIG. 1, the positive electrode active material 20 of the present embodiment contains the lithium-metal composite oxide 10 represented by the general formula (1): $Li_sNi_{1-x-y-x}Co_xMn_yM_xO_{2+\alpha}$ (where $0 \leq x \leq 0.35$, $0 \leq y \leq 0.35$, $0 \leq z \leq 0.10$, $0.95 < s < 1.30$, and $0 \leq \alpha \leq 0.2$; and M represents at least one element selected from V, Mg, Mo, Nb, Ti, W, and Al) and the lithium boron compound 3 (hereinafter, this is sometimes referred to as "LB compound 3"). The lithium-metal composite oxide 10 contains a secondary particle 2 formed by agglomeration of primary particles 1, in which at least part of the surface of the primary particles 1 is covered with the lithium boron compound 3. In addition, the lithium-metal composite oxide 10 represented by the general formula (1) has a crystal structure of a layered structure.

The lithium-metal composite oxide 10 can be obtained, for example, by firing, together with a lithium compound, a nickel composite hydroxide or a nickel composite oxide that is obtained by oxidizing-roasting of the nickel composite hydroxide. On the surfaces of the secondary particle 2 and the primary particles 1 of the lithium-metal composite oxide 10, an unreacted lithium compound mainly originated from a raw material is present. The unreacted lithium compound is eluted into the positive electrode mixed material paste (hereinafter, this is sometimes referred to as "paste") and reacts with a binder or with an organic solvent thereby occasionally causing gelation of the paste. In another instance, the excess lithium present in the lithium-metal composite oxide (crystalline structure) is eluted into the paste thereby occasionally causing gelation of the paste. The inventors of the present invention found that among the unreacted lithium and the lithium (redundant lithium) that is eluted from the composite oxide (crystalline structure), especially the lithium that is eluted as lithium hydroxide (LiOH) upon dispersing the positive electrode active material into a solvent (hereinafter, this type of lithium is sometimes referred to as "redundant lithium hydroxide") is one factor to cause gelation of the positive electrode mixed material paste. Accordingly, in order to suppress gelation of the paste, the inventors have presumed that control of the amount of the redundant lithium hydroxide that is eluted into the paste is important.

The positive electrode active material 20 of the present embodiment causes, as illustrated in FIG. 1(B), at least part of the redundant lithium including the redundant lithium hydroxide that is present on surfaces of the secondary particle 2 and the primary particles 1 to react with a boron compound to be described later so as to immobilize the lithium as the LB compound 3 onto the surface of the primary particles 1; and thus, the elution amount of LiOH is controlled within a certain range. Although the detailed mechanism is not clear, it is presumed that because of this, elution of the redundant lithium into the paste can be effectively suppressed so that gelation of the paste can be suppressed. According to the study of the inventors of the present invention, gelation of the paste can also be suppressed, for example, by adding an acidic compound to the paste so as to neutralize the redundant lithium that is eluted into the paste; however, when neutralization is carried out after the redundant lithium is eluted into the paste, it was found that satisfactory effect on suppression of gelation could not be obtained thereby resulting in deterioration of the battery characteristics.

In the positive electrode active material 20 of the present embodiment, at least part of the LB compound 3 covers the surface of the primary particles 1 of the lithium-metal composite oxide 10. The LB compound 3 has a high conductivity of the lithium ion so that it has an effect to facilitate transfer of the lithium ion. Therefore, even if the surface of the primary particles 1 of the lithium-metal composite oxide 10 is covered with the LB compound 3, the conductive pass of Li is formed in the interface with the electrolyte solution, so that the output characteristic of the battery can be retained without increasing the positive electrode resistance. In addition, because the voltage applied to the load side does not decrease, insertion and de-insertion of the lithium in the positive electrode take place sufficiently well, so that the charge-discharge capacity of the battery (hereinafter, this is sometimes referred to as "battery capacity") can be retained as well.

The surface of the primary particles 1 includes, as illustrated in FIG. 1(A), not only the surface of a primary particle 1a exposed to the outer surface (front surface) of the secondary particle 2 but also the surface of a primary particle 1b exposed to the vicinity of the surface of the secondary particle 2 as well as to the space inside thereof thereby being connected to outside the secondary particle 2 so that the electrolyte solution can be penetrated thereto. In addition, it includes the grain boundary between the primary particles 1 if the bond of the primary particles 1 is incomplete so that it is in the state that the electrolyte solution can be penetrated thereto. Namely, because elution of the redundant lithium (including redundant lithium hydroxide) takes place in the contact surface with the electrolyte solution, the boron compound reacts with the unreacted lithium compound that is present in the contact surface with the electrolyte solution; or the boron compound reacts with the excess lithium that is taken out from inside the metal composite oxide. With these reactions, the LB compound 3 is formed on the surface of the primary particles 1, so that the elution of the redundant lithium can be suppressed. In addition, even when the LB compound 3 is formed partially on the surface of the primary particles, the suppression effect of the gelation can also be obtained.

Presence of the LB compound 3 on the surface of the primary particle 1a that is exposed to the surface of the secondary particle 2 may be confirmed by, for example, the X-ray photoelectron spectroscopy (XPS). Presence of boron on the surface of the primary particle 1b inside the secondary particle 2 may be confirmed by, for example, the soft X-ray emission spectroscopy (SXES) that is provided to the field emission scanning electron microscope (FE-SEM). Meanwhile, direct confirmation of the existence form of a very small quantity of boron that is present inside the secondary particle 2 is difficult. However, because it is presumed that the element to form the compound with boron is lithium, and also, taking into consideration that at least part of the boron on the surface of the primary particle 1a that is exposed to the surface of the secondary particle 2 exists as the form of the lithium boron compound 3, it is presumed that the LB compound 3 (for example, lithium boron oxide) is also formed on the surface of the primary particle 1b inside the secondary particle 2.

(Amount of Redundant Lithium Hydroxide)

In the positive electrode active material 20, the amount of the eluted lithium hydroxide (redundant lithium hydroxide: LiOH) measured with a neutralization titration method upon dispersing the positive electrode active material in water is 0.5% or lower by mass, preferably at least 0.003% by mass and up to 0.5% by mass, while more preferably at least 0.005% by mass and up to 0.5% by mass, in terms of Li relative to the total of the positive electrode active material. As mentioned above, when the amount of the eluted lithium hydroxide is within the above-mentioned range, gelation of the paste can be suppressed very well, so that the secondary battery having excellent battery characteristics can be obtained. If the amount of the eluted lithium hydroxide is more than 0.5% by mass, it is resulted in the state that a large amount of the eluted lithium hydroxide is present; and thus, it is difficult to suppress gelation of the paste. On the other hand, if the amount of the eluted lithium hydroxide is less than 0.003% by mass, it is presumed that the boron compound forms the LB compound 3 with excessively taking out the lithium from the positive electrode active material, thereby leading to occasional deterioration of the battery characteristics. Meanwhile, in view of obtaining high battery characteristics, the lower limit of the amount of the eluted lithium hydroxide is preferably 0.01% or more by mass, while more preferably 0.1% or more by mass.

For example, as described in Patent Literature 3 and so forth, several positive electrode active materials in which the boron-including compound is present on the particle surface of the lithium-metal composite oxide have been reported; however, to control especially the amount of lithium hydroxide among the redundant lithium within a certain range by forming the LB compound 3 as in the case of the positive electrode active material 20 of the present embodiment has not been studied at all. On the other hand, in the positive electrode active material 20 of the present embodiment, by controlling the amount of the eluted lithium hydroxide within the above-mentioned range, gelation of the paste can be suppressed very well while keeping the battery characteristics.

The amount of the eluted lithium hydroxide (in terms of Li) can be measured, for example, as follows. Namely, 2 g of the positive electrode active material is mixed with 125 mL of pure water by stirring for 1 minute, to the dispersion solution thus obtained is added 5 mL of a barium chloride solution with the concentration of 10% by mass; and then, the eluted amount thereof can be measured from the hydrochloric acid amount added to the first neutralization point by a neutralization titration using hydrochloric acid with the concentration of 1.0 mol/L. By measuring the amount of the eluted lithium hydroxide, the elution degree of the lithium hydroxide into the paste can be evaluated. Meanwhile, the LB compound 3 included in the positive electrode active material is also occasionally dissolved into the supernatant; and this is neutralized in the same pH range as lithium hydroxide. Accordingly, the amount of the eluted lithium hydroxide may include the lithium which is derived from the LB compound 3 having been eluted into water and being titrated at the first neutralization point.

(Lithium Boron Compound)

The lithium-metal composite oxide 10 forms the LB compound 3 on the surface of the primary particles 1. The LB compound 3 is the compound having Li atom and B atom, in which it is preferable to include lithium borates. Illustrative example of the lithium borate includes $LiBO_2$ and hydrates thereof, $LiB_3O_3$, and a mixture of them.

(Composition of the Lithium-Metal Composite Oxide)

The lithium-metal composite oxide 10 is represented by the general formula (1): $Li_sNi_{1-x-y-z}Co_xMn_yM_zO_{2+\alpha}$ (where $0 \leq x \leq 0.35$, $0 \leq y \leq 0.35$, $0 \leq z \leq 0.10$, $0.95 < s < 1.30$, and $0 \leq \alpha \leq 0.2$; and M represents at least one element selected from V, Mg, Mo, Nb, Ti, W, and Al).

With regard to the composition of Ni, Co, Mn, and M in the lithium-metal composite oxide 10, compositions of publicly known lithium-metal composite oxides may be used, in which the composition may be appropriately selected in accordance with the characteristics that are required for the battery. In the general formula, s, which represents the Li content, may be, for example, about $0.95 < s < 1.20$. Also, x, which represents the Co content, may be, for example, about $0 < x \leq 0.20$; and y, which represents the Mn content, may be, for example, about $0 \leq x \leq 0.20$. Furthermore, z, which represents the M content, may be, for example, about $0 \leq z \leq 0.05$. As mentioned above, M may be selected from multiple elements in accordance with the required characteristics. Meanwhile, $\alpha$ in the general formula represents a coefficient which changes in accordance with the valencies of the metal elements that are included in the lithium-metal composite oxide other than lithium as well as with the atom number ratio of lithium to the metal elements other than lithium.

(Content of Boron)

The amount of boron included in the LB compound 3 is preferably at least 0.03% by mole and up to 8% by mole relative to the total of Ni, Co, Mn, and M in the composite oxide. In view of a high battery capacity and suppression of the gelation, the amount of boron included in the LB compound 3 is preferably at least 0.03% by mole and up to 2% by mole. In view of suppressing the gelation furthermore, the amount of boron included in the LB compound 3 is preferably more than 2% by mole and up to 8% by mole.

(Average Particle Diameter)

The average particle diameter of the lithium-metal composite oxide 10 is, for example, at least 5 μm and up to 30 μm, while preferably at least 5 μm and up to 20 μm. The average particle diameter is the volume-based average particle diameter measured with a laser diffraction scattering method.

(Spread of Particle Size Distribution)

In view of having the high filling property, [(d90−d10)/average particle diameter], which is an indicator to show spread of the particle size distribution, is preferably 0.70 or higher, while more preferably at least 0.70 and up to 1.2, although it is not particularly limited. Meanwhile, d10 means the particle diameter at which the cumulative volume reaches 10% of the total volume of the entire particles, the cumulative volume being obtained by accumulating the particle number in each particle diameter from a side of the smaller particle diameter; and d90 means the particle diameter at which the cumulative volume reaches 90% of the total volume of the entire particles, the cumulative volume being obtained by similarly accumulating the particle number. The d10 and d90 values can be obtained from the volume cumulative values measured with a laser diffraction scattering particle size analyzer, similarly to the average particle diameter.

(Average Particle Diameter of the Primary Particles)

The average particle diameter of the primary particles 1 is not particularly limited; however, it is preferably, for example, at least 0.2 μm and up to 1.0 μm, while more preferably at least 0.3 μm and up to 0.7 μm. With these conditions, further improved output characteristic, battery capacity, and cycle characteristic can be obtained when this is applied to the battery's positive electrode. If the average particle diameter of the primary particles 1 is smaller than 0.2 μm, there is a risk of insufficient firing so that sufficient battery performance cannot be obtained occasionally; on the other hand, if the average particle diameter of the primary particles 1 is larger than 0.7 μm, there is a risk that high output characteristic and cycle characteristic cannot be obtained occasionally.

In the positive electrode active material 20, the secondary particle 3 may have a hollow structure in which a hollow portion is formed inside the particle thereof. When the secondary particle 3 has the hollow structure, penetration of the electrolyte into inside the particle of the secondary particle 3 is further facilitated, so that a high output characteristic can be obtained more easily. Meanwhile, the hollow portion therein may be one or more. The hollow structure includes a porous structure which has many voids inside the particle of the secondary particle 3.

The positive electrode active material 20 includes the lithium-metal composite oxide 10 which is composed of the secondary particle 2 formed by agglomeration of the primary particles 1; however, it may also include a small amount of single primary particles 1 such as primary particles 1 not agglomerated as the secondary particle 2 and primary particles 1 released from the secondary particle 2 after being agglomerated. In addition, the positive electrode active material 20 may include a lithium-metal composite oxide other than the lithium-metal composite oxide 10 described above so far as the advantageous effects of the present invention are not impaired.

[Method for Manufacturing the Positive Electrode Active Material]

Figure 2:
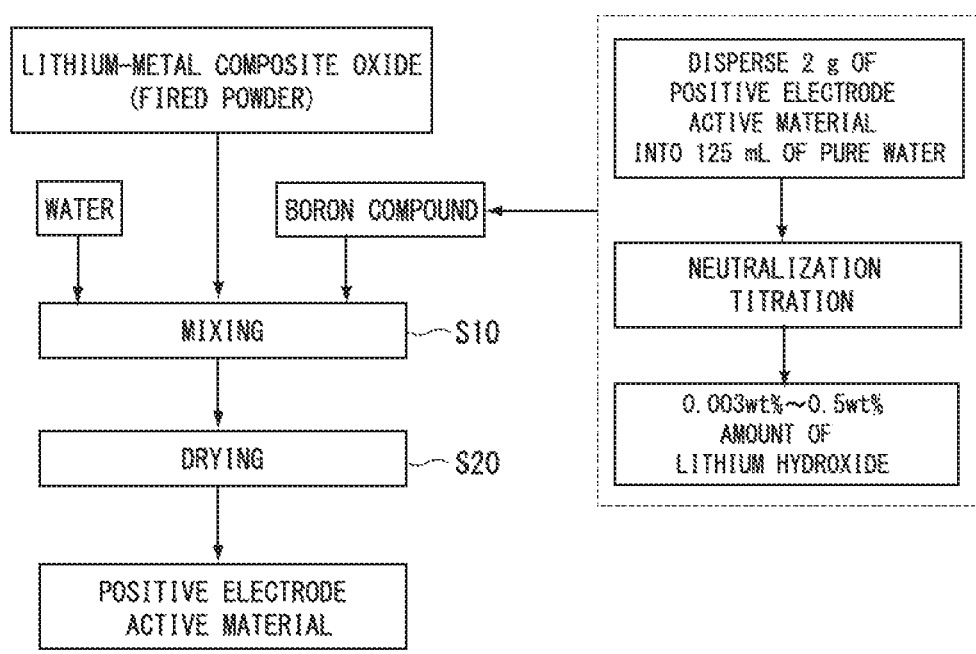
FIG. 2 illustrates one example of a method for manufacturing the positive electrode active material for a non-aqueous electrolyte secondary battery of the embodiment.
Figure 3:
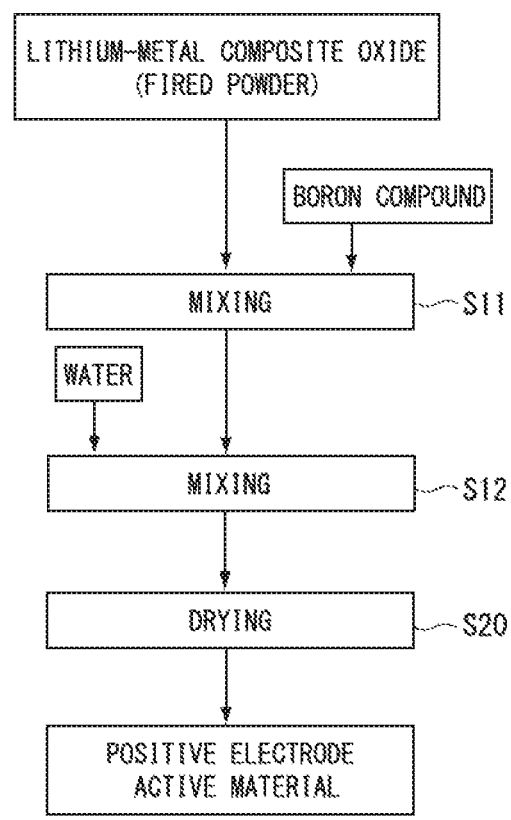
FIG. 3 illustrates one example of a method for manufacturing the positive electrode active material for a non-aqueous electrolyte secondary battery of the embodiment.

Next, the method for manufacturing the positive electrode active material relating to the embodiment of the present invention will be explained with referring to FIG. 2 and FIG. 3. FIG. 2 and FIG. 3 illustrate examples of the method for manufacturing the positive electrode active material of the present embodiment. The method for manufacturing the positive electrode active material includes: mixing fired powder including a lithium-metal composite oxide having a crystal structure of a layered structure, a boron compound (B compound) not including lithium but being capable of reacting with lithium, and water (Step S10); and drying the resultant mixture obtained by the mixing (Step S20). The mixing of the fired powder, the boron compound, and water (Step S1) may be carried out such that after the boron compound is dissolved into water, the resulting solution is added as a spray or as droplets to the fired powder and mixing is carried out. Hereinafter, each step will be explained.

First, as illustrated in FIG. 2, the fired powder including the lithium-metal composite oxide having a crystal structure of a layered structure, a boron compound not including lithium but being capable of reacting with lithium, and water are mixed (Step S10). In this process, the boron compound is mixed such that, in the obtained positive electrode active material, the amount of the eluted lithium hydroxide (LiOH) measured with a neutralization titration method upon dispersing the positive electrode active material in water may be in terms of Li at least 0.003% by mass and up to 0.5% by mass, while preferably at least 0.01% by mass and up to 0.30% by mass, relative to the total of the positive electrode active material. In addition, in view of obtaining a high battery capacity, the lower limit of the amount of the eluted lithium hydroxide is preferably 0.01% or more by mass, while more preferably 0.1% or more by mass.

As mentioned before, the amount of the eluted lithium hydroxide can be measured, for example, as follows. Namely, 2 g of the positive electrode active material is mixed with 125 mL of pure water by stirring for 1 minute, and then, to the dispersion solution thus obtained is added 5 mL of a barium chloride solution with the concentration of 10% by mass; and the amount of the lithium hydroxide (in terms of Li) eluted from the positive electrode active material can be measured from the hydrochloric acid amount added to the first neutralization point by a neutralization titration using hydrochloric acid with the concentration of 1.0 mol/L.

There is no particular limitation in the boron compound so far as it is a compound not including lithium but being capable of reacting with lithium. Illustrative examples of the boron compound include boric acid ($H_3BO_3$), boron oxide ($B_2O_3$), as well as ammonium borate such as ammonium tetraborate tetrahydrate (($NH_4$)$_2B_4O_7 \cdot 4H_2O$) and ammonium pentaborate octahydrate (($NH_4$)$_2O \cdot 5B_2O_3 \cdot 8H_2O$). Among them, in view of the reactivity with lithium, the boron compound is preferably at least one of boric acid ($H_3BO_3$) and boron oxide ($B_2O_3$). Meanwhile, the boron compound may be used singly or as a mixture of two or more of them.

In the mixing process (Step S10), boron is mixed such that lithium hydroxide that is eluted from the positive electrode active material may fall within the above-mentioned range. The boron compound such as boric acid forms the LB compound as hydrate via the neutralization reaction from the state in which water is present in the mixing process; then, it forms the anhydrous LB compound by evaporating the water in the drying process (Step S20) that follows thereafter. It is presumed that because of this LB compound, elution of lithium into the paste is suppressed.

The addition amount of the boron compound may be readily determined by a preliminary experiment in which a small amount of the fired powder is taken out in advance so as to confirm the amount of the redundant lithium hydroxide. When Li/Me and the production condition of the fired powder are stabilized, the redundant amount of lithium hydroxide of the positive electrode active material can be controlled within the above-mentioned range by the addition amount determined by the preliminary experiment.

The amount of the redundant lithium varies depending on the atomic ratio of Li to the total of Ni, Co, Mn, and M (Li/Me) in the fired powder of the lithium-metal composite oxide, or on the production condition of the fired powder. Therefore, the boron compound such as boric acid may be added with the amount such that the amount of lithium hydroxide eluted from the positive electrode active material may be controlled within the above-mentioned range by forming the LB compound with this redundant lithium.

As mentioned above, the mount of the boron compound to be mixed can be appropriately adjusted in accordance with the amount of the redundant lithium, whereas the amount of boron included in the boron compound may be, for example, at least 0.03% by mole and up to 8% by mole, while preferably at least 0.05% by mole and up to 4% by mole, relative to the total of Ni, Co, Mn, and M in the fired powder. With these conditions, the amount of the LB compound to be formed can be made appropriate, so that not only the amount of the redundant lithium hydroxide of the positive electrode active material can be controlled but also the battery capacity and so forth can be made suitable. Meanwhile, the amount of boron relative to the total of Ni, Co, Mn, and M is also maintained in the positive electrode active material to be obtained.

The amount of the water that is mixed in the mixing process (Step S10) can be appropriately adjusted in accordance with the powder characteristics and the particle structure of the fired powder, whereas, for example, the amount is preferably at least 1% by mass and up to 40% by mass relative to the fired powder. With these conditions, the reactions with the redundant lithium and with the excess lithium are facilitated to form the LB compound so that the elution of lithium can be reduced furthermore. In addition, the water that is used to dissolve boric acid or the like can be penetrated as the sufficient amount not only to the surface of the primary particles inside the lithium-metal composite oxide particle, but also uniformly to the region among the lithium-metal composite oxide particles, thereby suppressing the gelation.

In addition, as illustrated in FIG. 3, in the mixing process (Step S10), the boron compound and the water may be added to the fired powder after the boron compound is dissolved into the water in advance. To dissolve the boron compound into the water in advance is preferable because uniformity of the mixing state thereof in the fired powder can be further improved. When the addition amount of boric acid or the like is small, it is especially preferable to mix the boron compound with the water in advance. In addition, as depicted in FIG. 2, after the boron compound is added to and mixed with the fired powder (Step S11), water may be added and mixed (Step S12). Alternatively, after the water is added to and mixed with the fired powder, the boron compound may be added thereto. In addition, with regard to the boron compound depicted in FIG. 2, the boron compound which is dissolved into water in advance may be used, as mentioned above.

The fired powder is represented by the general formula $Li_sNi_{1-x-y-z}Co_xMn_yM_zO_{2+\alpha}$ (where $0 \leq x \leq 0.35$, $0 \leq y \leq 0.35$, $0 \leq z \leq 0.10$, $0.95 < s < 1.30$, and $0 \leq \alpha \leq 0.2$; and M represents at least one element selected from V, Mg, Mo, Nb, Ti, W, and Al) and contains the secondary particle formed by agglomeration of the primary particles. Because the powder characteristics and particle structure of the fired powder are succeeded to the positive electrode active material, the composition, powder characteristics, particle structure, and the like of the fired powder can be the same as those of the positive electrode active material except for not containing the LB compound. In addition, the fired powder may be selected in accordance with the positive electrode active material to be obtained.

The production method of the fired powder is not particularly limited, and it can be produced, for example, by a method in which a nickel composite hydroxide obtained by a crystallization method or a nickel composite oxide obtained by oxidizing-roasting of the nickel composite hydroxide is mixed with the lithium compound, which is then followed by firing the resulting mixture. With regard to the production method of the nickel composite hydroxide, any of a batch process and a continuous process may be applicable. In view of the cost, the continuous method in which the nickel composite hydroxide particles overflowed from a reaction vessel are continuously recovered is preferable.

The amount of the redundant lithium hydroxide included in the fired powder is preferably at least 0.05% by mass and up to 1.0% by mass, while preferably at least 0.1% by mass and up to 0.7% by mass. The amount of the redundant lithium hydroxide may be obtained, similarly to the above-mentioned method, by measuring the amount of lithium hydroxide that is eluted upon dispersing the fired powder into water with a neutralization titration using an acid. Meanwhile, unlike the positive electrode active material 20, the fired powder does not include the LB compound 3; and thus, the amount of the redundant lithium hydroxide in the fired powder means the amounts of the lithium hydroxide calculated from the unreacted lithium hydroxide at the time of firing and the lithium portion that is eluted into water (supernatant) from inside the composite oxide (crystalline structure).

When the amount of the redundant lithium hydroxide of the fired powder is within the above-mentioned range, the amount of the LB compound 3 that is formed by the reaction with the added boron compound can be made sufficient. Then, at least part of the surface of the primary particles 1 can be covered with the LB compound 3, so that when the positive electrode active material obtained is used in the battery, excellent output characteristic and battery capacity can be obtained. When the amount of the redundant lithium hydroxide of the fired powder is less than 0.05% by mass, the amount of the LB compound formed is insufficient so that the battery characteristics can occasionally deteriorate. On the other hand, when the amount of the redundant lithium hydroxide thereof is more than 1.0% by mass, even if the boron compound is mixed, the amount of the unreacted residual lithium hydroxide is so large that the gelation can occasionally take place at the time when the positive electrode active material is the paste. Meanwhile, when the amount of the redundant lithium hydroxide of the fired powder is, for example, at least 0.05% by mass and up to 1.0% by mass, while preferably at least 0.15% by mass and up to 1.0% by mass, both the suppression of gelation and the battery characteristics (battery capacity and output characteristic) can be competitively satisfied at high levels by causing the reaction with the boron compound under suitable conditions.

Next, the mixture obtained by mixing is dried (Step S20). In this step, the mixture obtained by mixing the boron compound, water, and the fired powder is dried so as to cause the reactions of the redundant lithium dissolved in the water of this mixture and the excess lithium in the lithium-metal composite oxide particle with the boron compound to form the LB compound on the surface of the primary particles.

The drying temperature is preferably 450° C. or lower. When the temperature is above 450° C., lithium is further released from inside the crystal of the lithium-metal composite oxide so that suppression of gelation of the paste can be occasionally insufficient. Therefore, in view of sufficient drying so as to avoid the release of lithium from the lithium-metal composite oxide, the drying temperature is more preferably at least 100° C. and up to 300° C., whereas the temperature may be at least 100° C. and up to 200° C. The drying time is not particularly limited, and it may be, for example, at least 1 hour and up to 24 hours.

With regard to the atmosphere during the time of drying, in order to avoid the reaction of water and carbonic acid in the atmosphere with the lithium on the surface of the lithium-metal composite oxide particle, it is preferable to employ an atmosphere of a decarbonized air or of an inert gas, or an evacuated atmosphere. The pressure of the atmosphere during the time of drying is preferably 1 atom or lower. When the pressure is higher than 1 atom, there is a risk that content of the water in the positive electrode active material cannot be lowered sufficiently.

The water fraction of the lithium-metal composite oxide particle after drying is not particularly limited, and it is preferably 0.2% or lower by mass, while more preferably 0.15% or lower. Meanwhile, the lower limit of the water fraction is, for example, 0% or higher by mass, while it may be 0.01% or higher by mass. When the water fraction of the powder is higher than 0.2% by mass, there is a risk of absorbing a gas component including carbon and sulfur in an atmosphere thereby occasionally forming the lithium compounds thereof on the surface thereof. Meanwhile, the measurement value of the water fraction is the measured value which is obtained by measurement using a Karl Fischer moisture meter under the condition of the vaporization temperature of 300° C.

[Positive Electrode Mixed Material Paste for Non-Aqueous Electrolyte Secondary Battery]

Next, the production method of the positive electrode mixed material paste for a non-aqueous electrolyte secondary battery relating to the present invention (hereinafter, this is sometimes referred to as "positive electrode mixed material paste") will be explained. In the positive electrode mixed material paste of the present embodiment, elution of lithium from the positive electrode active material is reduced so that gelation of the paste can be suppressed. Therefore, viscosity change of the paste is small even if it is stored for a long period of time, and thus it is the paste having a high stability. When the positive electrode is produced by using the paste like this, the positive electrode can be made stable and thus can have excellent characteristics as well, so that the battery characteristics finally obtained can be made high and stable.

The positive electrode mixed material paste includes the positive electrode active material. The composition material of the positive electrode mixed material paste is not particularly limited, so that the materials equivalent to those used in the publicly known positive electrode mixed material paste may be used. The positive electrode mixed material paste includes, for example, the positive electrode active material, a conductive agent, and a binder. Furthermore, the positive electrode mixed material paste may include a solvent. In the positive electrode mixed material paste, when the total mass of the solid portion of the positive electrode mixed material except that a solvent is 100 parts by mass, it is preferable that the content of the positive electrode active material be in the range of 60 to 95 parts by mass, the content of the conductive agent be in the range of 1 part by mass to 20 parts by mass, and the content of the binder be in the range of 1 part by mass to 20 parts by mass.

With regard to the conductive agent, for example, graphite (such as natural graphite, artificial graphite, and expandable graphite) as well as carbon black materials such as acetylene black and Ketchen black may be used. The binder plays a role to bind the active material particles. For example, polyvinylidene fluoride (PVDF), polytetrafluoroethylene (PTFE), a fluorine rubber, an ethylene propylene diene rubber, styrene butadiene, a cellulose-based resin, and polyacrylic acid may be used.

As necessary, the positive electrode active material, the conductive agent, and an activated carbon are dispersed, and a solvent which can dissolve the binder (binding agent) may be added to the positive electrode mixed material. With regard to the solvent, specifically an organic solvent such as N-methyl-2-pyrrolidone (NMP) may be used. In addition, in order to increase the electric double layer capacity, an activated carbon may be added to the positive electrode mixed material. The positive electrode mixed material paste may be produced by mixing the positive electrode active material in the form of powder, the conductive agent, and the binder, and as necessary, by further adding the activated carbon and a solvent for the purpose of viscosity control, and the like, followed by kneading them.

The viscosity ratio of the positive electrode mixed material paste after and before the storage for 76 hours (paste viscosity after storage for 76 hours/paste viscosity immediately after preparation) changes depending on the characteristics and so forth of the lithium-metal composite oxide to be used as the fired powder, so that it is not particularly limited, and it may be, for example, at least 0.5 and up to 2, preferably at least 0.5 and up to 0.9, while more preferably at least 0.5 and up to 0.85. The viscosity ratio after and before the storage for 76 hours is evaluated as follows. Namely, after the positive electrode mixed material paste is obtained by mixing 25.0 g of the positive electrode active material, 1.5 g of carbon powder as the conductive agent, and 2.9 g of polyvinylidene fluoride (PVDF) by using a planetary motion kneading machine, the paste obtained is stored in an air atmosphere for 76 hours; and the viscosity ratio after and before the storage (paste viscosity after storage for 76 hours/paste viscosity immediately after preparation) is measured. The viscosity may be measured by, for example, using a vibration-type viscometer (VM10A, manufactured by Sekonic Corp.).

[Non-Aqueous Electrolyte Secondary Battery]

Next, the non-aqueous electrolyte secondary battery relating to the present embodiment of the present invention will be explained. The non-aqueous electrolyte secondary battery of the present embodiment (hereinafter, this is sometimes simply referred to as "secondary battery") is not particularly limited, whereby this battery is composed of the same composition elements as those of publicly known non-aqueous electrolyte secondary batteries. The secondary battery includes, for example, a positive electrode, a negative electrode, a separator, and a non-aqueous electrolyte solution. Meanwhile, the embodiment explained hereinafter is merely an example, so that the non-aqueous electrolyte secondary battery of the present embodiment may be carried out with the embodiments changed or modified in various ways by knowledge of a person skilled in the art on the basis of the embodiments described in the present specification. In addition, the non-aqueous electrolyte secondary battery of the present embodiment does not particularly limit the use thereof.

(a) Positive Electrode

The positive electrode of the non-aqueous electrolyte secondary battery is prepared using the positive electrode mixed material paste including the positive electrode active material, for example, as described below. The positive electrode mixed material paste is applied to the surface of an electric collector made of, for example, aluminum foil, and then it is dried to remove the solvent by evaporation. In order to increase the electrode density, it is sometimes pressed, as necessary, with a roll-press or the like. In such a way, the sheet-like positive electrode can be prepared. The sheet-like positive electrode is, for example, cut to a proper size in accordance with the target battery; and then, this can be used for preparation of the battery. However, the preparation method of the positive electrode is not limited to the above-mentioned example; it may be prepared by other method.

(b) Negative Electrode

As the negative electrode, the shaped article is used which is prepared in such a way that a negative electrode mixed material, which is obtained by mixing a binder with a metal lithium, a lithium alloy, or the like, or a negative electrode active material capable of storing and de-inserting the lithium ion, followed by addition of a suitable solvent so as to make it a paste-like form, is applied to the surface of an electric collector formed of metal foil such as copper foil, and then it is dried and, as necessary, compressed so as to increase the electrode density.

With regard to the negative electrode active material, for example, a natural graphite, an artificial graphite, a fired body of an organic compound such as a phenol resin, and a powdery body of a carbon substance such as cokes may be used. In this case, as the negative electrode binder, similarly to the positive electrode, among others a fluorine-containing resin such as PVDF may be used; and as the solvent to disperse the active material and binder, an organic solvent such as N-methyl-2-pyrrolidone may be used.

(c) Separator

Between the positive electrode and the negative electrode, a separator interposed therebetween is arranged. The separator separates between the positive electrode and the negative electrode, and it stores the electrolyte. The separator is a thin film made of polyethylene, polypropylene or the like; and a film having many fine pores may be used as the separator.

(d) Non-Aqueous Electrolyte Solution

The non-aqueous electrolyte solution is made by dissolving a lithium salt as a supporting salt in an organic solvent.

Illustrative example of the organic solvent includes cyclic carbonates such as ethylene carbonate, propylene carbonate, butylene carbonate, and trifluoropropylene carbonate; linear carbonates such as diethyl carbonate, dimethyl carbonate, ethyl methyl carbonate, and dipropyl carbonate; ether compounds such as tetrahydrofuran, 2-methyl tetrahydrofuran, and dimethoxy ethane; sulfur compounds such as ethyl methyl sulfone and butane sultone; and phosphorous compounds such as triethyl phosphate and trioctyl phosphate. The solvent is selected from these solvents and may be used singly or as a mixture of two or more of them.

With regard to the supporting salt, $LiPF_6$, $LiBF_4$, $LiClO_4$, $LiAsF_6$, $LiN(CF_3SO_2)_2$, and the like, or composite salts thereof may be used. Furthermore, the non-aqueous electrolyte solution may include a radical scavenger, a surfactant, a flame retardant, and so forth.

(e) Form and Composition of the Battery

The non-aqueous electrolyte secondary battery of the present embodiment, composed of the positive electrode, the negative electrode, the separator, and the non-aqueous electrolyte solution as explained above, can have various forms such as a cylindrical type form and a laminate type form. In any forms used, the positive electrode and the negative electrode are laminated via the separator to form an electrode body; then, the electrode body thus obtained is impregnated with the non-aqueous electrolyte solution. Then, between a positive electrode collector and a positive electrode terminal leading to outside, and between a negative electrode collector and a negative electrode terminal leading to outside are connected by a collector lead or the like; and the resulting structural body is sealed in a battery case thereby completing the non-aqueous electrolyte secondary battery.

(f) Characteristics

The secondary battery using the positive electrode active material of the present embodiment has a high battery capacity. In the secondary battery using the positive electrode active material that is obtained by the preferable embodiment, when this is used, for example, in the positive electrode of a 2032 coin-type battery (FIG. 4), a high initial discharge capacity of 190 mAh/g or higher can be obtained. In addition, in this secondary battery, for example, the discharge capacity retention rate (initial charge-discharge efficiency) can be 90% or higher. Meanwhile, the initial discharge capacity is the capacity that is measured as follows. Namely, in the coin-type battery 1 used in Example, after the open circuit voltage (OCV) is stabilized by allowing it to leave for about 24 hours after the preparation thereof, it is charged to the cut-off voltage of 4.3 V under the current density of 0.1 mA/cm² to the positive electrode; and after 1 hour of pause, it is discharged to the cut-off voltage of 3.0 V, and the capacity at this time is regarded as the initial discharge capacity.

The initial charge capacity in the case when the positive electrode active material of the present embodiment is used in the positive electrode of the 2032 coin-type battery can be at least 90% and up to 110%, while it may be at least 95% and up to 100% as well, relative to the initial charge capacity of 100% in the case when the positive electrode active material having the same composition as those of the above-mentioned except for not including the lithium boron compound (for example, the fired powder before being mixed with the boron compound and water in the method for manufacturing the positive electrode active material) is used in the positive electrode of the 2032 coin-type battery. Also, the initial discharge capacity in the case when the positive electrode active material of the present embodiment is used in the positive electrode of the 2032 coin-type battery can be at least 90% and up to 110%, while it may be at least 95% and up to 100% as well, relative to the initial discharge capacity of 100% in the case when the fired powder is used in the positive electrode of the 2032 coin-type battery.

In addition, the initial charge-discharge efficiency in the case when the positive electrode active material of the present embodiment is used in the positive electrode of the 2032 coin-type battery can be 1-fold or more, while can be at least 1-fold and up to 1.1-fold as well, relative to the initial charge-discharge efficiency in the case when the fired powder is used in the positive electrode of the 2032 coin-type battery.

Figure 5:
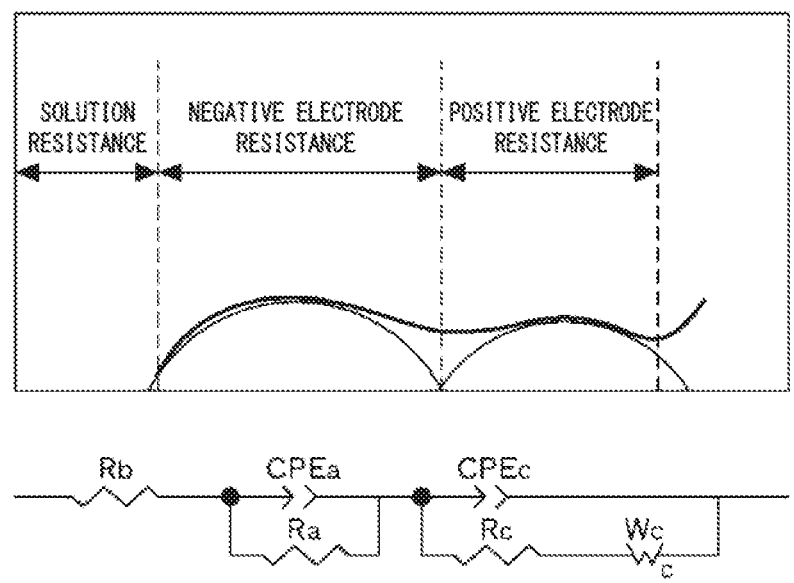
FIG. 5 illustrates a measurement example of the impedance evaluation and is a schematic explanatory drawing of the equivalent circuit used for the analysis.

In the secondary battery using the positive electrode active material obtained by the preferable embodiment, for example, the positive electrode resistance measured by using the above-mentioned coin-type battery can be 4Ω or lower. Meanwhile, the measurement method of the positive electrode resistance in the present embodiment may be exemplified as follows. When the frequency dependence of the cell reaction is measured with an alternating current impedance method which is generally used as an electrochemical evaluation method, the Nyquist diagram based on the solution resistance, the negative electrode resistance, the negative electrode capacity, the positive electrode resistance, and the positive electrode capacity can be obtained as depicted in FIG. 5. The cell reaction in the electrode includes a resistance component accompanied with the charge transfer and a capacity component by the electric double layer, in which the electric circuit of the electrode is expressed as a parallel circuit of the resistance and the capacity; and as the entire battery, this is expressed by the equivalent circuit in which the solution resistance and the parallel circuit of the negative and positive electrodes are connected in series. The fitting calculation is carried out to the Nyquist diagram measured by using this equivalent circuit so that each resistance component and capacity component can be estimated. The positive electrode resistance corresponds to the diameter of the semicircle in the low frequency side of the obtained Nyquist diagram. From the above, the alternating current impedance is measured for the positive electrode thus prepared; and the fitting calculation is carried out to the obtained Nyquist diagram by using the equivalent circuit so that the positive electrode resistance can be estimated.

The positive electrode resistance thereof can be 2.5-folds or lower, for example, at least 1-fold and up to 2-folds, relative to the positive electrode resistance in the case when the fired powder is used in the positive electrode of the 2032 coin-type battery.

EXAMPLES

Hereinafter, the present invention will be explained specifically by using Examples of the present invention; however, the present invention is not limited at all by these Examples. With regard to the positive electrode active material obtained by Examples of the present embodiment as well as the positive electrode mixed material paste and non-aqueous electrolyte secondary battery using this positive electrode active material, the performances thereof (stability of the paste, initial discharge capacity, positive electrode resistance, and discharge capacity retention rate) were measured. Meanwhile, in these Examples, for production of the composite hydroxide, as well as for preparation of the positive electrode active material and the secondary battery, all the samples used herein were special reagent grades manufactured by Wako Pure Chemical Industries, Ltd.

(Battery Preparation and Evaluation Method)

Figure 4:
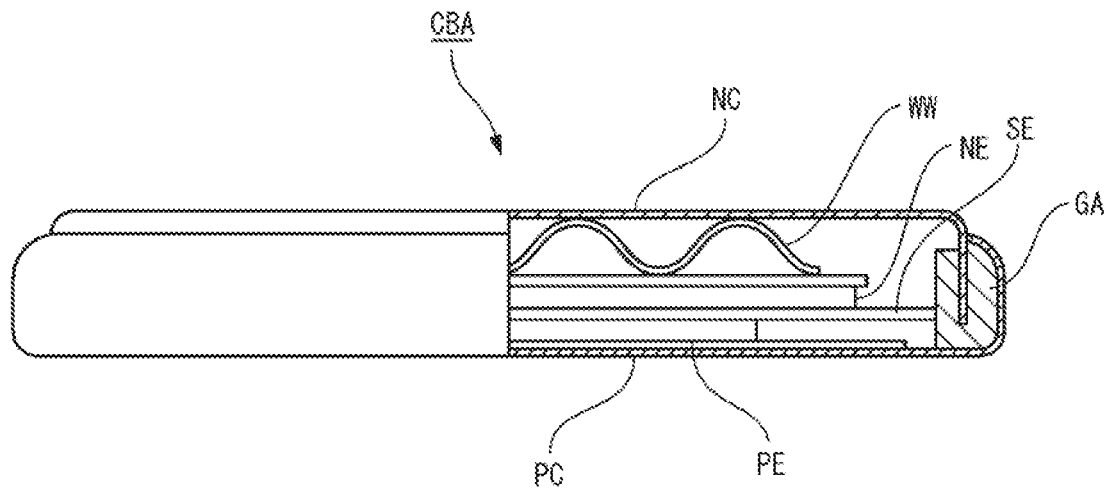
FIG. 4 is a schematic sectional view of a coin-type battery used for the battery evaluation.

Evaluation of the obtained positive electrode active material for a non-aqueous electrolyte secondary battery was carried out by producing the 2032 coin-type battery CBA illustrated in FIG. 4, which was then followed by measuring the charge-discharge capacity thereof, as described below. Namely, 52.5 mg of the positive electrode active material for a non-aqueous electrolyte secondary battery, 15 mg of acetylene black, and 7.5 mg of polytetrafluoroethylene (PTFE) resin were mixed, and then the resulting mixture was press-molded at the pressure of 100 MPa to produce the positive electrode PE (electrode for evaluation) with the diameter of 11 mm and the thickness of 100 μm. The positive electrode PE thus produced was dried at 120° C. in a vacuum dryer for 12 hours. Then, the coin-type battery CBA was prepared by using this positive electrode PE in a globe box under an Ar atmosphere with controlling the dew point thereof at −80° C.

For the negative electrode NE, the negative electrode sheet, having graphite powder with the average particle diameter of about 20 μm and polyvinylidene fluoride applied onto copper foil, and having been stamped out to a disk-like shape with the diameter of 14 mm, was used. For the electrolyte solution, an equal amount mixture of ethylene carbonate (EC) and diethyl carbonate (DEC) (manufactured by Tomiyama Pure Chemical Industries, Ltd.) having 1-M $LiPF_6$ as the supporting electrolyte was used. For the separator SEA, a polyethylene porous film having the film thickness of 25 μm was used. The coin-type battery CBA having the gasket GA and the wave washer WW was fabricated with the positive electrode can PC and the negative electrode can NC to the battery having a coin-like shape.

By using the coin-type battery CBA thus produced, the initial discharge capacity and the positive electrode resistance were evaluated as follows.

(Initial Discharge Capacity)

The initial discharge capacity was measured as follows. Namely, after the open circuit voltage (OCV) was stabilized by leaving the coin-type battery 1 for about 24 hours after it was prepared, it was charged to the cut-off voltage of 4.3 V under the current density of 0.1 $mA/cm^2$ to the positive electrode; and after 1 hour of pause, it was discharged to the cut-off voltage of 3.0 V, and the capacity at this time was regarded as the initial discharge capacity.

(Positive Electrode Resistance)

The positive electrode resistance is measured by the alternate current impedance method using a frequency response analyzer and a potentiogalvanostat (1255B, manufactured by Solartron Analytical Inc.). The coin-type battery 1 is charged with the charge voltage of 4.1 V, so that the Nyquist plot illustrated in FIG. 5 can be obtained. The Nyquist plot is expressed as the sum of the characteristic curves indicating the solution resistance, the negative electrode resistance and the capacity thereof, and the positive electrode resistance and the capacity thereof; and thus, on the basis of the Nyquist plot, the fitting calculation was carried out to calculate the positive electrode resistance value by using the equivalent circuit.

(Viscosity Stability of the Paste)

By using a planetary motion kneader, 25.0 g of the positive electrode active material, 1.5 g of carbon powder as the conductive agent and 2.9 g of polyvinylidene fluoride (PVDF) were mixed to obtain the positive electrode mixed material paste. The paste thus obtained was stored under an air atmosphere for 76 hours; and then, the viscosity ratio after and before the storage (paste viscosity after storage for 76 hours/paste viscosity immediately after preparation) was evaluated. The viscosity was measured with a vibration-type viscometer (VM10A, manufactured by Sekonic Corp.).

(Water Fraction)

This was measured with a Karl Fischer moisture meter under the vaporization temperature condition of 300° C.

Production of the Positive Electrode Active Material

Example 1

The fired powder of the lithium-metal composite oxide, which was obtained by a publicly known technology in which a mixture of hydroxide powder mainly composed of Ni with lithium hydroxide was fired, and which was represented by $Li_{1.025}Ni_{0.88}Co_{0.09}Al_{0.03}O_2$ with the average particle diameter of 12.5 μm and the [(d90−d10)/average particle diameter] of 0.80, was used as a base material.

To the base material (fired powder) was added boric acid (manufactured by Hayashi Pure Chemical Ind., Ltd.) with the amount thereof being 3% by mole as the boron amount in the boric acid relative to the total of Ni, Co, and Al included in the fired powder of the lithium-metal composite oxide; after they were mixed, water was added to this mixture with the amount thereof being 10% by mass relative to the fired powder of the lithium-metal composite oxide; they were further mixed. Thereafter, under an evacuated atmosphere the resulting mixture was heated to 100° C. and dried for 12 hours; and then, it was further heated to 190° C. and dried for 10 hours to obtain the positive electrode active material. From the XPS measurement of the positive electrode active material thus obtained, the peaks of $LiBO_2$ were confirmed. The evaluation results of the water fraction of the positive electrode active material and the viscosity ratio of the paste are summarized in Table 1.

[Titration of Redundant Lithium]

After 2 g of the obtained positive electrode active material was mixed with 125 mL of pure water by stirring for 1 minute; to the dispersion solution thus obtained was added 5 mL of a barium chloride solution with the concentration of 10% by mass, and then, the amount of the redundant lithium hydroxide was measured from the amount of the hydrochloric acid added to the first neutralization point by a neutralization titration using hydrochloric acid with the concentration of 1.0 mol/L. The evaluation results of the amount of the redundant lithium are summarized in Table 1.

[Battery Evaluation]

Battery characteristics of the coin-type battery having the positive electrode produced by using the obtained positive electrode active material were evaluated. The evaluation results of the initial charge-discharge capacity and positive electrode resistance of the coin-type battery are summarized in Table 1.

Example 2

The positive electrode active material was obtained and evaluated in the same way as Example 1 except that 1.0% by mole of boric acid as the boron amount was added. Evaluation results are summarized in Table 1.

Example 3

The positive electrode active material was obtained and evaluated in the same way as Example 1 except that 8.0% by mole of boric acid as the boron amount was added. Evaluation results are summarized in Table 1.

Example 4

The positive electrode active material was obtained and evaluated in the same way as Example 2 except that the amount of the added water was changed to 1% by mass. Evaluation results are summarized in Table 1.

Example 5

The positive electrode active material was obtained and evaluated in the same way as Example 2 except that the amount of the added water was changed to 40% by mass. Evaluation results are summarized in Table 1.

Example 6

The positive electrode active material was obtained and evaluated in the same way as Example 1 except that 0.5% by mole of boric acid as the boron amount was added. Evaluation results are summarized in Table 1.

Example 7

The positive electrode active material was obtained and evaluated in the same way as Example 1 except that 4% by mole of boric acid as the boron amount was added. Evaluation results are summarized in Table 1.

Comparative Example 1

The positive electrode active material was obtained and evaluated in the same way as Example 1 except that neither boric acid nor water was added. Evaluation results are summarized in Table 1.

Comparative Example 2

The positive electrode active material for a non-aqueous electrolyte secondary battery was obtained and evaluated in the same way as Example 1 except that 0.01% by mole of boric acid as the boron amount was added. Evaluation results are summarized in Table 1.

Comparative Example 3

The positive electrode active material was obtained and evaluated in the same way as Example 1 except that 10% by mole of boric acid as the boron amount was added. Evaluation results are summarized in Table 1.

Comparative Example 4

The positive electrode active material was obtained and evaluated in the same way as Example 1 except that the positive electrode active material was used in the mixed state without adding water and without drying. Evaluation results are summarized in Table 1.

TABLE 1

| | B Compound Addition amount wt % | Water Addition amount wt % | Positive electrode active material | | Paste Viscosity ratio — | Secondary battery | | |
|---|---|---|---|---|---|---|---|---|
| | | | Amount of LiOH wt % | Water fraction wt % | | Initial charge capacity mAh/g | Discharge capacity mAh/g | Positive electrode resistance $\Omega$ |
| Example 1 | 3 | 10 | 0.018 | 0.15 | 0.77 | 217 | 198 | 2.7 |
| Example 2 | 1 | 10 | 0.066 | 0.11 | 0.83 | 225 | 204 | 2.2 |
| Example 3 | 8 | 10 | 0.004 | 0.12 | 0.55 | 205 | 188 | 3.5 |
| Example 4 | 3 | 1 | 0.017 | 0.1 | 0.75 | 216 | 197 | 2.5 |
| Example 5 | 3 | 40 | 0.019 | 0.13 | 0.7 | 215 | 195 | 2.8 |
| Example 6 | 0.5 | 10 | 0.25 | 0.11 | 0.95 | 228 | 208 | 2.2 |
| Example 7 | 4 | 10 | 0.015 | 0.14 | 0.68 | 211 | 196 | 2.8 |
| Comparative Example 1 | 0 | 0 | 0.55 | 0.12 | 6.5 | 227 | 205 | 1.7 |
| Comparative Example 2 | 0.01 | 10 | 0.53 | 0.1 | 6.4 | 226 | 204 | 1.7 |
| Comparative Example 3 | 10 | 10 | 0.002 | 0.14 | 0.55 | 201 | 180 | 5.2 |
| Comparative Example 4 | 3 | 0 | 0.02 | 0.09 | 0.88 | 180 | 161 | 4.1 |

(Evaluation)

In the batteries using the positive electrode active materials of Examples, excellent results were obtained in both the initial discharge capacity and the positive electrode resistance. In addition, the viscosity ratio of the positive electrode mixed material paste was 1 or lower; therefore, it was confirmed that the paste viscosity was stable.

In the positive electrode active material of Comparative Example 1, because boric acid was not added, the amount of the redundant lithium hydroxide measured with the titration was more than 0.5% by mass relative to the positive electrode active material. In the positive electrode mixed material paste of Comparative Example 1, increase of the viscosity was large. In the positive electrode active material of Comparative Example 2, because the addition amount of boric acid was small, the amount of the redundant lithium hydroxide evaluated with the titration was more than 0.5% by mass, so that not only gelation of the positive electrode mixed material could not be suppressed but also increase of the viscosity of the positive electrode mixed material paste was large. In Comparative Example 3, because excess boric acid was added, the amount of redundant lithium hydroxide was small; however, because boric acid excessively took out the lithium from inside the positive electrode active material, the charge-discharge capacity and the positive electrode resistance were deteriorated. It was presumed that the state would occur in which more than the necessary amount of lithium was taken out from the lithium-metal composite oxide. In the battery using the positive electrode active material of Comparative Example 3, the initial discharge capacity was decreased.

In Comparative Example 4, because water was not added at the time when boric acid was mixed, formation of the LB compound by the reactions with the redundant lithium and excess lithium was not recognized. In the positive electrode active material of Comparative Example 4, the charge-discharge capacity was significantly decreased.

From the above results, it can be seen that in the positive electrode active material of the present embodiment, when water and the boric compound are mixed and the addition amount of the boron raw material is set in the appropriate range, an excellent output characteristic as well as a high battery capacity can be obtained competitively with the suppression effect of gelation of the paste at the time of production of the electrode.

The technical scope of the present invention is not limited to the aspects that were explained in the above-described embodiments and so forth. One or more of the elements explained in the above-described embodiments and so forth can be omitted. In addition, the elements explained in the above-described embodiments and so forth can be appropriately combined. In addition, so far as the relevant laws permit, contents of all the references cited in Japanese Patent Application Nos. 2016-098093 and 2016-218994 as well as in the above-described embodiments and so forth are cited so as to make them a part of the present description.

DESCRIPTION OF REFERENCE SIGNS 1, 1a, 1b Primary particle
2 Secondary particle
3 Lithium boron compound
10 Lithium-metal composite oxide
20 Positive electrode active material
CBA Coin-type battery
PE Positive electrode (electrode for evaluation)
NE Negative electrode
SE Separator
GA Gasket
WW Wave washer
PC Positive electrode can
NC Negative electrode can

The invention claimed is:

1. A positive electrode active material for a non-aqueous electrolyte secondary battery, the positive electrode active material comprising:
a lithium-metal composite oxide represented by a general formula $Li_sNi_{1-x-y-z}Co_xMn_yMzO_{2+\alpha}$, (where $0 \pm x \pm 0.35$, $0 \pm y \pm 0.35, 0 \pm z \pm 0.10, 0.95 < s < 1.30$, and $0, \pm \Delta \pm 0.2$, and M represents at least one element selected from V, Mg, Mo, Nb, Ti, W, and Al) and a lithium boron compound, wherein
the lithium-metal composite oxide comprises a secondary particle formed by agglomeration of primary particles, at least part of the surface of the primary particles is covered with the lithium boron compound,
the amount of boron included in the lithium boron compound is at least 0.03% by mole and up to 8% by mole relative to the total of Ni, Co, Mn, and M in the positive electrode active material,
the amount of lithium of an eluted lithium compound measured with a neutralization titration method upon dispersing the positive electrode active material in water is at least 0.003% by mass and up to 0.5% by mass relative to the total mass of the positive electrode active material, and
the amount of lithium is determined by the neutralization titration method under the following conditions: 2 g of the positive electrode active material is mixed with 125 mL of pure water by stirring for 1 minute to obtain a dispersion solution, 5 mL of a solution containing 10% by mass of barium chloride is added to the dispersion solution, and the amount of lithium of the eluted lithium compound is determined from an amount of hydrochloric acid needed to reach a first neutralization point by the neutralization titration of the dispersion solution with the hydrochloric acid, the eluted lithium compound comprising lithium hydroxide and a part of the lithium boron compound being neutralized in the same pH range as lithium hydroxide.

2. The positive electrode active material for a non-aqueous electrolyte secondary battery according to claim 1, wherein the lithium boron compound comprises lithium borate.

3. A method for manufacturing a positive electrode active material of claim 1 for a non-aqueous electrolyte secondary battery, the method comprising:
mixing fired powder comprising a lithium-metal composite oxide having a crystal structure of a layered structure, a boron compound not including lithium but being capable of reacting with lithium, and water; and
drying the resultant mixture obtained by the mixing to obtain the positive electrode active material of claim 1, wherein
the fired powder is represented by a general formula $Li_sNi_{1-x-y-z}Co_xMn_yM_zO_{2+\alpha}$, (where $0 \le x \le 0.35$, $0 \le y \le 0.35$, $0 \le z \le 0.10$, $0.95 < s < 1.30$, and $0 \le \alpha \le 0.2$, and M represents at least one element selected from V, Mg, Mo, Nb, Ti, W, and Al) and contains a secondary particle formed by agglomeration of primary particles, and
the boron compound is mixed such that the amount of an eluted lithium hydroxide measured with a neutralization titration method upon dispersing the positive electrode active material in water is at least 0.003% by mass and up to 0.5% by mass relative to the total of the positive electrode active material.

4. The method for manufacturing the positive electrode active material for a non-aqueous electrolyte secondary battery according to claim 3, wherein after mixing the boron compound with the fired powder, the water is added to the resultant mixture with an amount thereof being at least 1% by mass and up to 40% by mass relative to the fired powder.

5. The method for manufacturing the positive electrode active material for a non-aqueous electrolyte secondary battery according to claim 3, wherein the drying is carried out at least 100° C. and up to 300° C.

6. The method for manufacturing the positive electrode active material for a non-aqueous electrolyte secondary battery according to claim 3, wherein the surface of the primary particles of the positive electrode active material is covered with a lithium boron compound.

7. The method for manufacturing the positive electrode active material for a non-aqueous electrolyte secondary battery according to claim 3, wherein the boron compound comprises at least one of boric acid, boron oxide, and ammonium borate.

8. The method for manufacturing the positive electrode active material for a non-aqueous electrolyte secondary battery according to claim 3, wherein an addition amount of boron included in the boron compound is at least 0.03% by mole and up to 8% by mole relative to the total of Ni, Co, Mn, and M in the fired powder.

9. Positive electrode mixed material paste for a non-aqueous electrolyte secondary battery, the positive electrode mixed material paste comprising the positive electrode active material for a non-aqueous electrolyte secondary battery according to claim 1.

10. A non-aqueous electrolyte secondary battery comprising a positive electrode that comprises the positive electrode active material for a non-aqueous electrolyte secondary battery according to claim 1.

11. The positive electrode active material for nonaqueous electrolyte secondary batteries of claim 1, wherein the lithium boron compound is $LiBO_2$.

12. The positive electrode active material for nonaqueous electrolyte secondary batteries of claim 1, wherein the amount of lithium of the eluted lithium compound is at least 0.1% by mass.

* * * * *